United States Patent
Gillan et al.

(10) Patent No.: US 12,060,788 B2
(45) Date of Patent: Aug. 13, 2024

(54) AVOIDING COLLISION WITH OFFSET WELL(S) HAVING A TRAJECTORY, OR TRAJECTORIES, CLOSING ON A DRILLING WELL

(71) Applicant: Nabors Drilling Technologies USA, Inc., Houston, TX (US)

(72) Inventors: Colin Gillan, Houston, TX (US); Mohammad Hamzah, Katy, TX (US); Tatiana Borges, Katy, TX (US)

(73) Assignee: NABORS DRILLING TECHNOLOGIES USA, INC., Houston, TX (US)

( * ) Notice: Subject to any disclaimer, the term of this patent is extended or adjusted under 35 U.S.C. 154(b) by 132 days.

(21) Appl. No.: 17/477,912

(22) Filed: Sep. 17, 2021

(65) Prior Publication Data
US 2023/0089439 A1 Mar. 23, 2023

(51) Int. Cl.
*E21B 47/022* (2012.01)
*E21B 7/04* (2006.01)
*G06Q 10/06* (2023.01)
*G06Q 50/02* (2024.01)

(52) U.S. Cl.
CPC .............. *E21B 47/022* (2013.01); *E21B 7/04* (2013.01); *G06Q 10/06* (2013.01); *G06Q 50/02* (2013.01)

(58) Field of Classification Search
USPC ........................................................ 705/7.27
See application file for complete search history.

(56) References Cited

U.S. PATENT DOCUMENTS

| | | | |
|---|---|---|---|
| 7,681,663 B2 * | 3/2010 | Cobern | E21B 47/024 73/152.43 |
| 2007/0044536 A1* | 3/2007 | Gunsaulis | E21B 7/10 73/1.79 |
| 2008/0296064 A1* | 12/2008 | Al Hadhrami | E21B 47/022 175/45 |
| 2013/0333946 A1* | 12/2013 | Sugiura | E21B 47/022 175/24 |
| 2014/0135995 A1* | 5/2014 | Samuel | E21B 43/00 700/275 |
| 2015/0292266 A1* | 10/2015 | Johnson | E21B 7/04 700/275 |
| 2016/0041302 A1* | 2/2016 | Priezzhev | G06F 17/10 703/2 |

(Continued)

FOREIGN PATENT DOCUMENTS

WO WO-2018090348 A1 * 5/2018

OTHER PUBLICATIONS

Sawaryn, S. J., Wilson, H., Bang, J., Nyrnes, E., Sentance, A., Poedjono, B., Lowdon, R., Mitchell, I., Codling, J., Clark, P. J., and W. T. Allen. "Well-Collision-Avoidance Separation Rule." SPE Drill & Compl 34 (2019): 01-15. (Year: 2019).*

*Primary Examiner* — Brian M Epstein
*Assistant Examiner* — Kristin E Gavin
(74) *Attorney, Agent, or Firm* — Haynes and Boone, LLP

(57) ABSTRACT

A method and apparatus for oil and gas operations according to which a bottom hole trajectory of a drilling well is surveyed using a survey tool located uphole from a drill bit positioned at a bottom hole location. One or more offset wells are identified having a trajectory, or respective trajectories, closing on the bottom hole trajectory of the drilling well. An anti-collision steering strategy for the drilling well to avoid the one or more offset wells is determined.

8 Claims, 11 Drawing Sheets

(56) References Cited

U.S. PATENT DOCUMENTS

| | | | | |
|---|---|---|---|---|
| 2016/0326864 | A1* | 11/2016 | Dwars | E21B 47/024 |
| 2017/0089140 | A1* | 3/2017 | Shaw | E21B 47/13 |
| 2017/0306702 | A1* | 10/2017 | Summers | E21B 7/10 |
| 2017/0306742 | A1* | 10/2017 | Xue | G05B 19/0426 |
| 2017/0371064 | A1* | 12/2017 | Rodney | E21B 47/13 |
| 2018/0051552 | A1* | 2/2018 | Li | E21B 47/024 |
| 2019/0136682 | A1* | 5/2019 | Benson | E21B 7/04 |
| 2019/0302307 | A1* | 10/2019 | Arbus | G01V 5/06 |
| 2022/0195804 | A1* | 6/2022 | Codling | E21B 41/0035 |

* cited by examiner

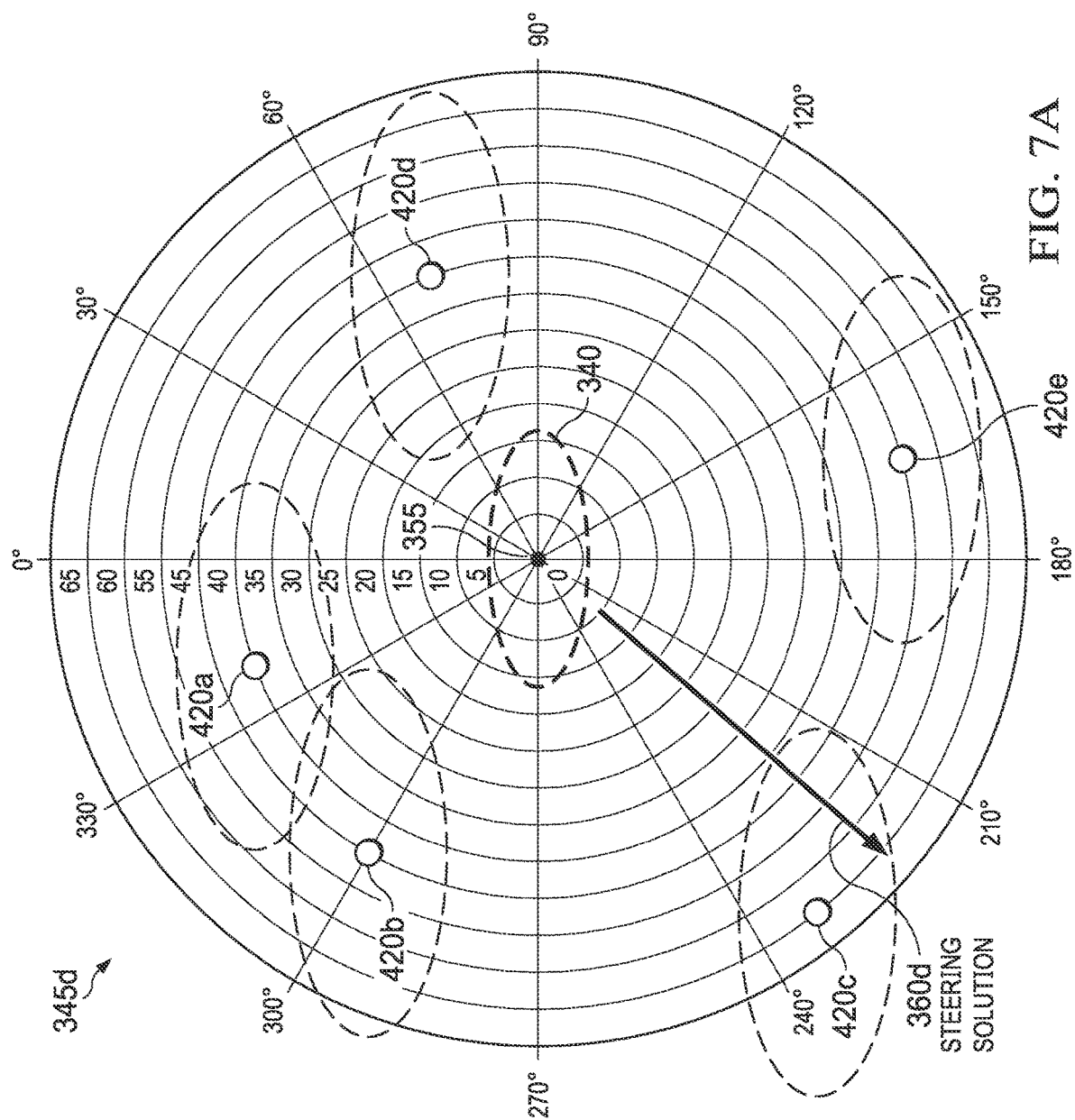

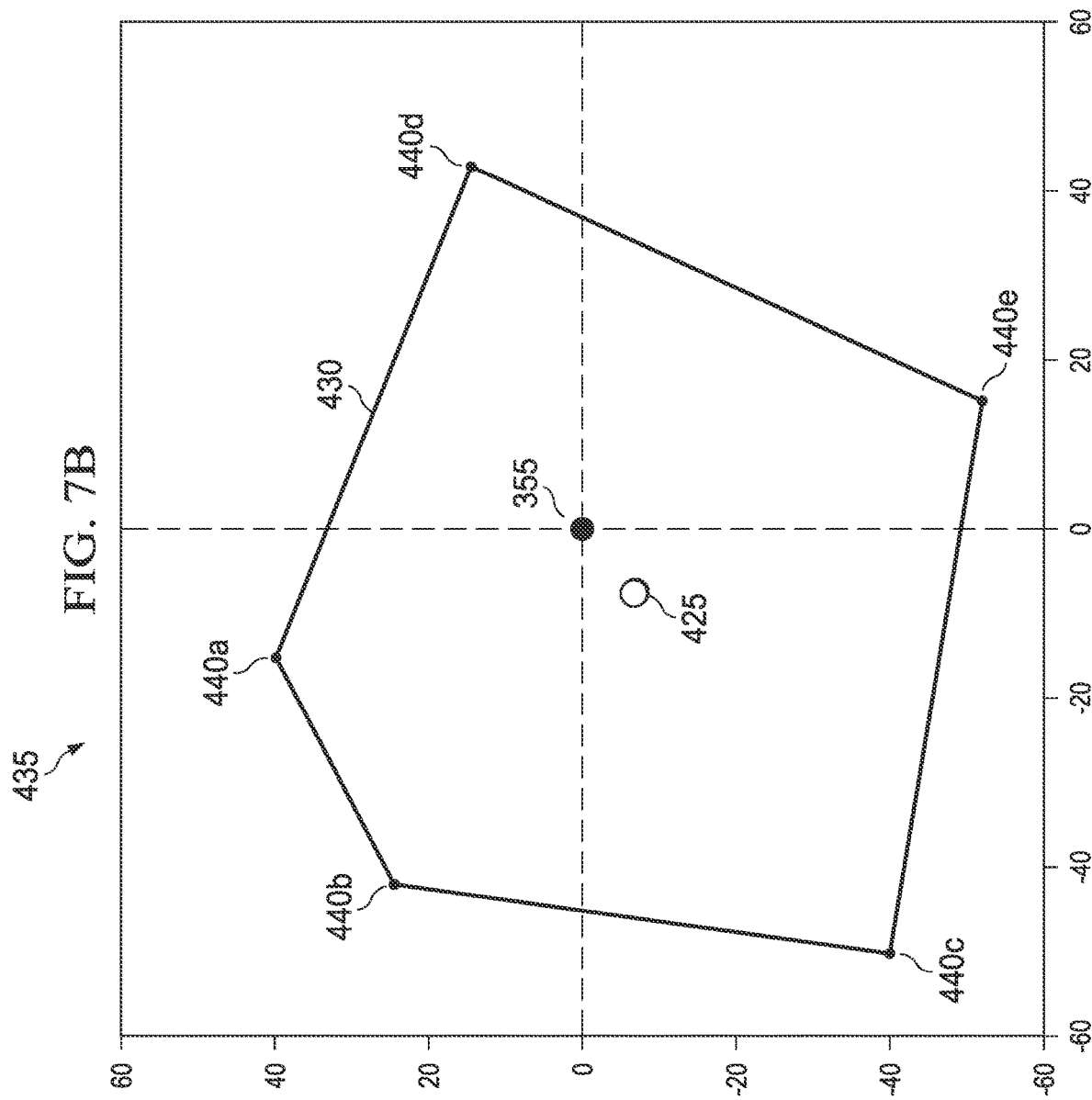

AVOIDING COLLISION WITH OFFSET WELL(S) HAVING A TRAJECTORY, OR TRAJECTORIES, CLOSING ON A DRILLING WELL

TECHNICAL FIELD

This application related generally to drilling oil and gas wellbores, and, more particularly, to avoiding collision with offset well(s) having a trajectory, or trajectories, closing on a drilling well.

BRIEF DESCRIPTION OF THE DRAWINGS

FIG. 7A is a diagrammatic view of a fourth anti-collision scenario, in which five (5) offset wells are closing onto the drilling well, according to one or more embodiments.

FIG. 7B is a diagrammatic illustration of a centroid solution to the fourth anti-collision scenario illustrated in FIG. 7A, according to one or more embodiments.

DETAILED DESCRIPTION

During drilling operations, directional drilling decisions are made by operators (e.g., directional drilling operators) using a variety of tools (such as, for example, well planning an monitoring software) to track the actual trajectory of a well versus the planned trajectory, to make anti-collision calculations (avoiding colliding into other wells), and to make trajectory projections (facilitating planning of the next course of action). The work of such operators intensifies significantly when the anti-collision risk is high and when formation tendencies negatively affect the directional drilling drive mechanism response. Additionally, there is demand for a single directional drilling supervisor to make decisions on multiple wells on a single tour in a remote operations center using several of the above-mentioned variety of tools. This further amplifies the workload of directional drilling supervisors and increases the likelihood for human error. The present disclosure introduces apparatus, system(s), and method(s) for automating at least a portion of the operator's decision-making process, especially with respect to generating drilling instructions for drilling within a safe window by avoiding elevated anti-collision risks and complying with relevant drilling constraints (such as, for example, drilling and rig equipment limits, tortuosity boundaries, drilling tolerance windows, and geo-steering constraints).

Figure 1:
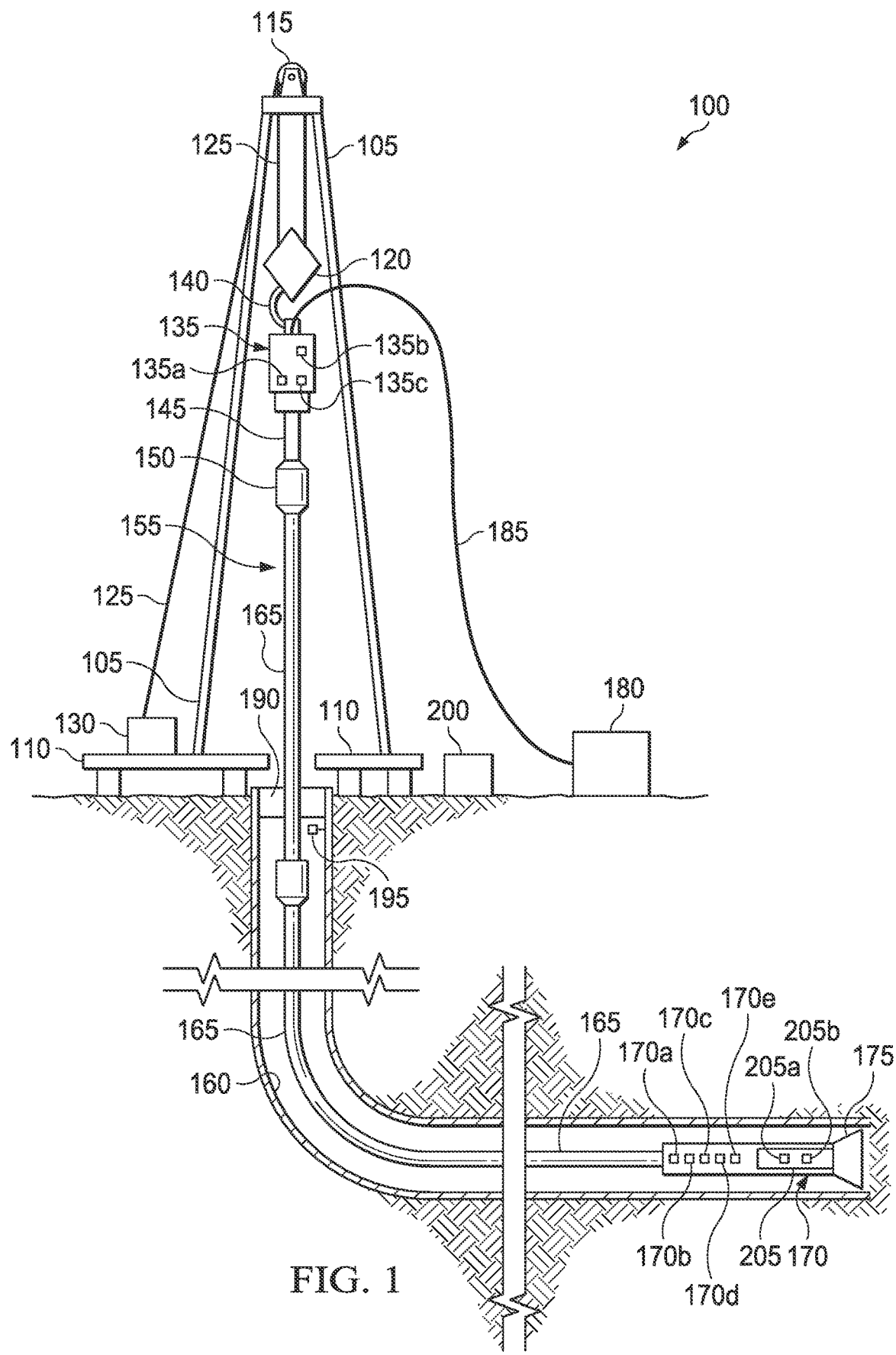
FIG. 1 is a schematic elevational view of a well system, according to one or more embodiments of the present disclosure.

Referring to FIG. 1, in an embodiment, a well system (e.g., a drilling rig) for implementing one or more embodiments of the present disclosure is schematically illustrated and generally referred to by the reference numeral 100. The well system 100 is or includes a land-based drilling rig—however, one or more aspects of the present disclosure are applicable or readily adaptable to any type of drilling rig (e.g., a jack-up rig, a semisubmersible, a drill ship, a coiled tubing rig, a well service rig adapted for drilling and/or re-entry operations, and a casing drilling rig, among others). The well system 100 includes a mast 105 that supports lifting gear above a rig floor 110, which lifting gear includes a crown block 115 and a traveling block 120. The crown block 115 is coupled to the mast 105 at or near the top of the mast 105. The traveling block 120 hangs from the crown block 115 by a drilling line 125. The drilling line 125 extends at one end from the lifting gear to drawworks 130, which drawworks 130 are configured to reel out and reel in the drilling line 125 to cause the traveling block 120 to be lowered and raised relative to the rig floor 110. The other end of the drilling line 125 (known as a dead line anchor) is anchored to a fixed position, possibly near the drawworks 130 (or elsewhere on the rig).

The well system 100 further includes a top drive 135, a hook 140, a quill 145, a saver sub 150, and a drill string 155. The top drive 135 is suspended from the hook 140, which hook is attached to the bottom of the traveling block 120. The quill 145 extends from the top drive 135 and is attached to a saver sub 150, which saver sub is attached to the drill string 155. The drill string 155 is thus suspended within a wellbore 160. The quill 145 may instead be attached directly to the drill string 155. The term "quill" as used herein is not limited to a component which directly extends from the top drive 135, or which is otherwise conventionally referred to as a quill 145. For example, within the scope of the present disclosure, the "quill" may additionally (or alternatively) include a main shaft, a drive shaft, an output shaft, and/or another component which transfers torque, position, and/or rotation from the top drive 135 or other rotary driving element to the drill string 155, at least indirectly. Nonetheless, albeit merely for the sake of clarity and conciseness, these components may be collectively referred to herein as the "quill."

The drill string 155 includes interconnected sections of drill pipe 165, a bottom-hole assembly ("BHA") 170, and a drill bit 175. The BHA 170 may include stabilizers, drill collars, and/or measurement-while-drilling ("MWD") or wireline conveyed instruments, among other components. The drill bit 175 is connected to the bottom of the BHA 170 or is otherwise attached to the drill string 155. One or more mud pumps 180 deliver drilling fluid to the drill string 155 through a hose or other conduit 185, which conduit may be connected to the top drive 135. The downhole MWD or wireline conveyed instruments may be configured for the evaluation of physical properties such as pressure, temperature, torque, weight-on-bit ("WOB"), vibration, inclination, azimuth, toolface orientation in three-dimensional space, and/or other downhole parameters. These measurements may be made downhole, stored in solid-state memory for some time, and downloaded from the instrument(s) at the surface and/or transmitted in real-time or delayed time to the surface. Data transmission methods may include, for example, digitally encoding data and transmitting the encoded data to the surface as pressure pulses in the drilling fluid or mud system. The MWD tools and/or other portions of the BHA 170 may have the ability to store measurements for later retrieval via wireline and/or when the BHA 170 is tripped out of the wellbore 160.

The well system 100 may also include a rotating blow-out preventer ("BOP") 190, such as if the wellbore 160 is being drilled utilizing under-balanced or managed-pressure drilling methods. In such an embodiment, the annulus mud and cuttings may be pressurized at the surface, with the actual desired flow and pressure possibly being controlled by a choke system, and the fluid and pressure being retained at the well head and directed down the flow line to the choke system by the rotating BOP 190. The well system 100 may also include a surface casing annular pressure sensor 195 configured to detect the pressure in the annulus defined between, for example, the wellbore 160 (or casing therein) and the drill string 155. In the embodiment of FIG. 1, the top drive 135 is utilized to impart rotary motion to the drill string 155. However, aspects of the present disclosure are also applicable or readily adaptable to embodiments utilizing other drive systems, such as a power swivel, a rotary table, a coiled tubing unit, a downhole motor, and/or a conventional rotary rig, among others.

The well system 100 also includes a control system 200 configured to control or assist in the control of one or more components of the well system 100—for example, the control system 200 may be configured to transmit operational control signals to the drawworks 130, the top drive 135, the BHA 170 and/or the mud pump(s) 180. The control system 200 may be a stand-alone component installed near the mast 105 and/or other components of the well system 100. In several embodiments, the control system 200 includes one or more systems located in a control room proximate the well system 100, such as the general purpose shelter often referred to as the "doghouse" serving as a combination tool shed, office, communications center, and general meeting place. The control system 200 may be configured to transmit the operational control signals to the drawworks 130, the top drive 135, the BHA 170, and/or the mud pump(s) 180 via wired or wireless transmission. The control system 200 may also be configured to receive electronic signals via wired or wireless transmission from a variety of sensors included in the well system 100, where each sensor is configured to detect an operational characteristic or parameter. The sensors from which the control system 200 is configured to receive electronic signals via wired or wireless transmission may be, include, or be part of one or more of the following: a torque sensor 135a, a speed sensor 135b, a WOB sensor 135c, downhole pressure sensor(s) 170a, a shock/vibration sensor 170b, a toolface sensor 170c, a WOB sensor 170d, an MWD survey tool 170e, the surface casing annular pressure sensor 195, a mud motor delta pressure ("ΔP") sensor 205a, and one or more torque sensors 205b.

It is noted that the meaning of the word "detecting," in the context of the present disclosure, may include detecting, sensing, measuring, calculating, and/or otherwise obtaining data. Similarly, the meaning of the word "detect" in the context of the present disclosure may include detect, sense, measure, calculate, and/or otherwise obtain data. The detection performed by the sensors described herein may be performed once, continuously, periodically, and/or at random intervals. The detection may be manually triggered by an operator or other person accessing a human-machine interface (HMI), or automatically triggered by, for example, a triggering characteristic or parameter satisfying a predetermined condition (e.g., expiration of a time period, drilling progress reaching a predetermined depth, drill bit usage reaching a predetermined amount, etc.). Such sensors and/or other detection means may include one or more interfaces which may be local at the well/rig site or located at another, remote location with a network link to the well system 100.

The well system 100 may include any combination of the following: the torque sensor 135a, the speed sensor 135b, and the WOB sensor 135c. The torque sensor 135a is coupled to or otherwise associated with the top drive 135—however, the torque sensor 135a may alternatively be part of or associated with the BHA 170. The torque sensor 135a is configured to detect a value (or range) of the torsion of the quill 145 and/or the drill string 155 in response to, for example, operational forces acting on the drill string 155. The speed sensor 135b is configured to detect a value (or range) of the rotational speed of the quill 145. The WOB sensor 135c is coupled to or otherwise associated with the top drive 135, the drawworks 130, the crown block 115, the traveling block 120, the drilling line 125 (which includes the dead line anchor), or another component in the load path mechanisms of the well system 100. More particularly, the WOB sensor 135c includes one or more sensors different from the WOB sensor 170d that detect and calculate weight-on-bit, which can vary from rig to rig (e.g., calculated from a hook load sensor based on active and static hook load).

Further, the well system 100 may additionally (or alternatively) include any combination of the following: the downhole pressure sensor(s) 170a, the shock/vibration sensor 170b, the toolface sensor 170c, and the WOB sensor 170d. The downhole pressure sensor(s) 170a is/are coupled to or otherwise associated with the BHA 170. One or more of the downhole pressure sensor(s) 170a may be configured to detect a pressure value or range in the annulus-shaped region defined between the external surface of the BHA 170 and the internal diameter of the wellbore 160 (also referred to as the casing pressure, downhole casing pressure, MWD casing pressure, or downhole annular pressure); such measurements may include both static annular pressure (i.e., when the mud pump(s) 180 are off) and active annular pressure (i.e., when the mud pump(s) 180 are on). In addition, or instead, one or more of the downhole pressure sensor(s) 170a may be configured to detect a pressure value or range internal to the drill pipe 165 and/or the BHA 170 (also referred to as the downhole drill string pressure); such measurements may include both static drill string pressure (i.e., when the mud pump(s) 180 are off) and active drill string pressure (i.e., when the mud pump(s) 180 are on). The shock/vibration sensor 170b is configured for detecting shock and/or vibration in the BHA 170. The toolface sensor 170c is configured to detect the current toolface orientation of the drill bit 175, and may be or include a magnetic toolface sensor which detects toolface orientation relative to magnetic north or true north. In addition, or instead, the toolface sensor 170c may be or include a gravity toolface sensor which detects toolface orientation relative to the Earth's gravitational field. In addition, or instead, the toolface sensor 170c may be or include a gyro sensor. The WOB sensor 170d may be integral to the BHA 170 and is configured to detect WOB at or near the BHA 170.

Further still, the well system 100 may additionally (or alternatively) include the MWD survey tool 170e at or near the BHA 170. In several embodiments, the MWD survey tool 170e may include any of the sensors 170a-170d or any combination of these sensors. The BHA 170 and the MWD portion of the BHA 170 (which portion includes the sensors 170a-d and the MWD survey tool 170e) may be collectively referred to as a "downhole tool." Alternatively, the BHA 170 and the MWD portion of the BHA 170 may each be individually referred to as a "downhole tool." The MWD survey tool 170e may be configured to perform surveys along lengths of a wellbore, such as during drilling and tripping operations. The data from these surveys may be transmitted by the MWD survey tool 170e to the control system 200 through various telemetry methods, such as mud pulses. In addition, or instead, the data from the surveys may be stored within the MWD survey tool 170e or an associated memory. In such embodiments, the survey data may be downloaded to the control system 200 when the MWD survey tool 170e is removed from the wellbore or at a maintenance facility at a later time.

Finally, the well system 100 may additionally (or alternatively) include any combination of the following: the mud motor ΔP sensor 205a and the torque sensor(s) 205b. The mud motor ΔP sensor 205a is configured to detect a pressure differential value or range across one or more motors 205 of the BHA 170 and may comprise one or more individual pressure sensors and/or a comparison tool. The motor(s) 205 may each be or include a positive displacement drilling motor that uses hydraulic power of the drilling fluid to drive the drill bit 175 (also known as a mud motor). The torque sensor(s) 205b may also be included in the BHA 170 for sending data to the control system 200 that is indicative of the torque applied to the drill bit 175 by the motor(s) 205.

Figure 2:
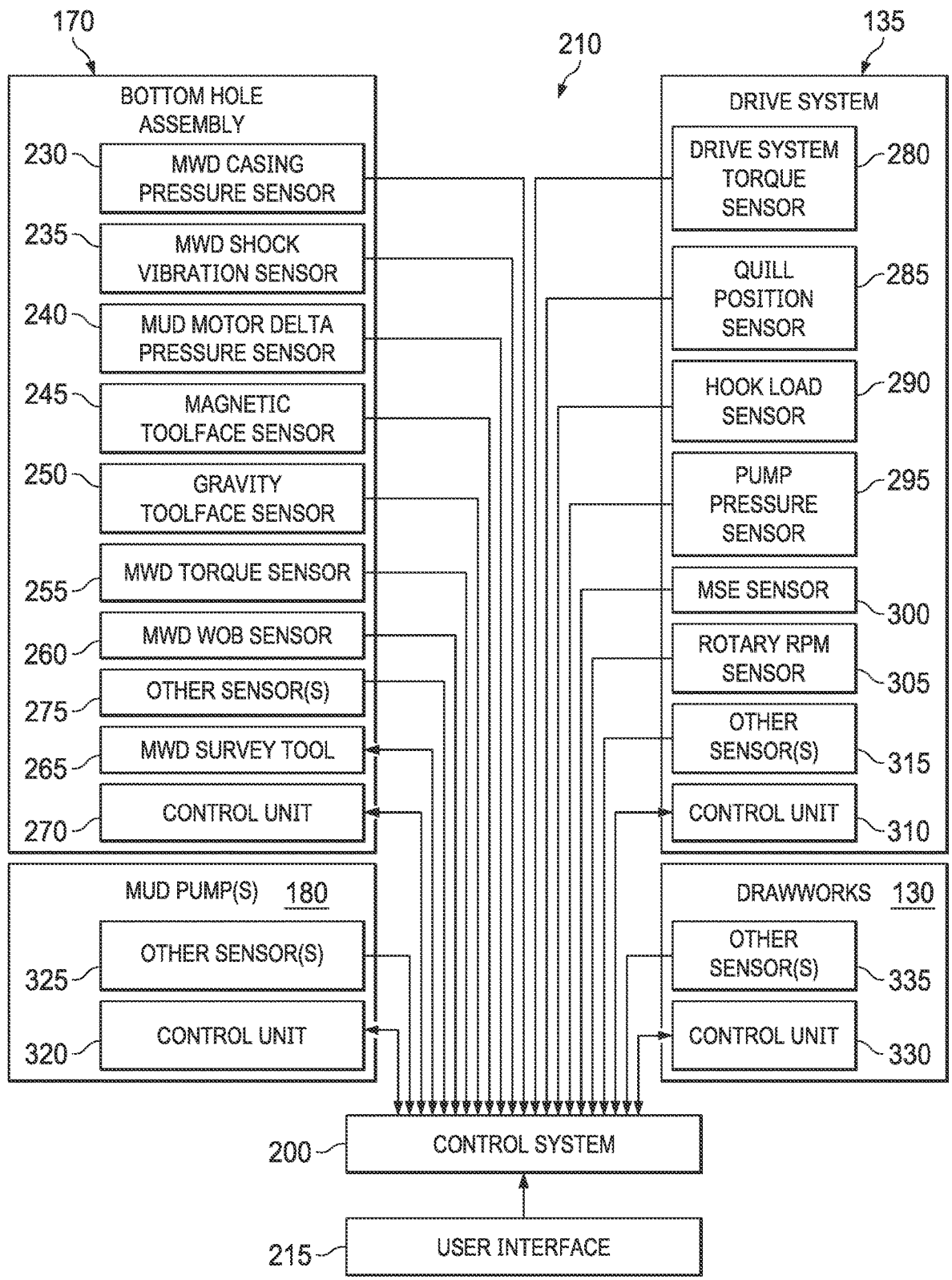
FIG. 2 is a diagrammatic view of a well system that may be, include, or be part of the well system of FIG. 1, according to one or more embodiments of the present disclosure.

Referring to FIG. 2, in an embodiment, a well system is generally referred to by the reference numeral 210 and includes one or more components of the well system 100. More particularly, the well system 210 may include at least respective parts of the well system 100, including, but not limited to, the control system 200, the drawworks 130, the top drive 135 (identified as a "drive system" in FIG. 2), the BHA 170, and the mud pump(s) 180. The well system 210 may be implemented within the environment and/or the well system 100 of FIG. 1. As such, the well system 100 and/or the well system 210 may be individually or collectively referred to as a "well system," a "drilling system," a "drilling rig," or the like. As shown in FIG. 2, the control system 200 includes a user-interface 215 adapted to communicate therewith—depending on the embodiment, the control system 200 and the user-interface 215 may be discrete components that are interconnected via a wired or wireless link. The user-interface 215 and the control system 200 may additionally (or alternatively) be integral components of a single system.

Figure 3:
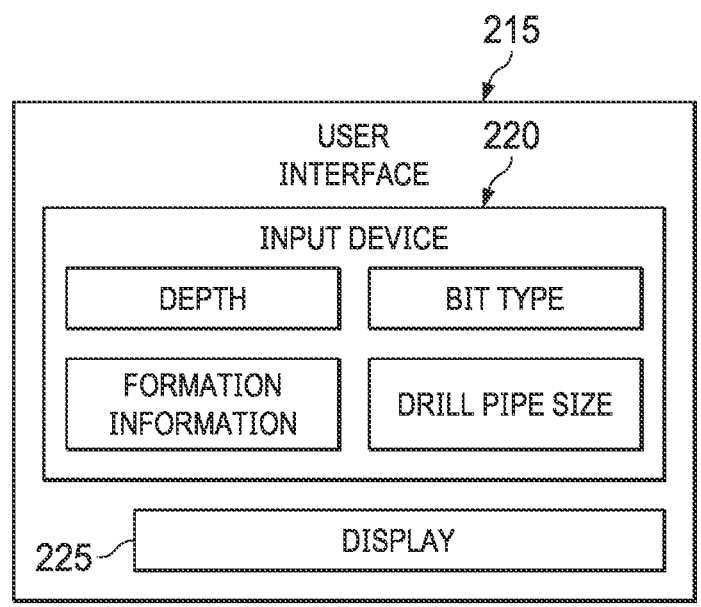
FIG. 3 is a diagrammatic view of a user interface of the well system of FIG. 2, according to one or more embodiments of the present disclosure.

Referring to FIG. 3, in an embodiment, the user-interface 215 includes an input mechanism 220 that permits a user to input drilling settings or parameters such as, for example, left and right oscillation revolution settings (these settings control the drive system to oscillate a portion of the drill string 155), acceleration, toolface setpoints, rotation settings, a torque target value (such as a previously calculated torque target value that may determine the limits of oscillation), information relating to the drilling parameters of the drill string 155 (such as BHA information or arrangement, drill pipe size, bit type, depth, and formation information), and/or other setpoints and input data. The input mechanism 220 may include a keypad, voice-recognition apparatus, dial, button, switch, slide selector, toggle, joystick, mouse, database, and/or any other suitable data input device. The input mechanism 220 may support data input from local and/or remote locations. In addition, or instead, the input mechanism 220, when included, may permit user-selection of predetermined profiles, algorithms, setpoint values or ranges, such as via one or more drop-down menus—this data may instead (or in addition) be selected by the control system 200 via the execution of one or more database look-up procedures. In general, the input mechanism 220 and/or other components within the scope of the present disclosure support operation and/or monitoring from stations on the rig site as well as one or more remote locations with a communications link to the system, network, local area network ("LAN"), wide area network ("WAN"), Internet, satellite-link, and/or radio, among other suitable techniques or systems. The user-interface 215 may also include a display unit 225 for visually presenting information to the user in textual, graphic, or video form. The display unit 225 may be utilized by the user to input drilling parameters, limits, or setpoint data in conjunction with the input mechanism 220—for example, the input mechanism 220 may be integral to or otherwise communicably coupled with the display unit 225. The control system 200 may be configured to receive data or information from the user, the drawworks 130, the top drive 135, the BHA 170, and/or the mud pump(s) 180—the control system 200 processes such data or information to enable effective and efficient drilling.

Referring back to FIG. 2, in an embodiment, the BHA 170 includes one or more sensors (typically a plurality of sensors) located and configured about the BHA 170 to detect parameters relating to the drilling environment, the condition and orientation of the BHA 170, and/or other information. For example, the BHA 170 may include an MWD casing pressure sensor 230, an MWD shock/vibration sensor 235, a mud motor ΔP sensor 240, a magnetic toolface sensor 245, a gravity toolface sensor 250, an MWD torque sensor 255, and an MWD weight-on-bit ("WOB") sensor 260—in several embodiments, one or more of these sensors is, includes, or is part of the following sensor(s) shown in FIG. 1: the downhole pressure sensor(s) 170a, the shock/vibration sensor 170b, the toolface sensor 170c, the WOB sensor 170d, the mud motor ΔP sensor 205a, and/or the torque sensor(s) 205b.

The MWD casing pressure sensor 230 is configured to detect an annular pressure value or range at or near the MWD portion of the BHA 170. The MWD shock/vibration sensor 235 is configured to detect shock and/or vibration in the MWD portion of the BHA 170. The mud motor ΔP sensor 240 is configured to detect a pressure differential value or range across the mud motor of the BHA 170. The magnetic toolface sensor 245 and the gravity toolface sensor 250 are cooperatively configured to detect the current toolface orientation. In several embodiments, the magnetic toolface sensor 245 is or includes a magnetic toolface sensor that detects toolface orientation relative to magnetic north or true north. In several embodiments, the gravity toolface sensor 250 is or includes a gravity toolface sensor that detects toolface orientation relative to the Earth's gravitational field. In several embodiments, the magnetic toolface sensor 245 detects the current toolface when the end of the wellbore 160 is less than about 7° from vertical, and the gravity toolface sensor 250 detects the current toolface when the end of the wellbore 160 is greater than about 7° from vertical. Other toolface sensors may also be utilized within the scope of the present disclosure that may be more or less precise (or have the same degree of precision), including non-magnetic toolface sensors and non-gravitational inclination sensors. The MWD torque sensor 255 is configured to detect a value or range of values for torque applied to the bit by the motor(s) of the BHA 170. The MWD weight-on-bit ("WOB") sensor 260 is configured to detect a value (or range of values) for WOB at or near the BHA 170.

The following data may be sent to the control system 200 via one or more signals, such as, for example, electronic signal via wired or wireless transmission, mud-pulse telemetry, another signal, or any combination thereof: the casing pressure data detected by the MWD casing pressure sensor 230, the shock/vibration data detected by the MWD shock/vibration sensor 235, the pressure differential data detected by the mud motor ΔP sensor 240, the toolface orientation data detected by the toolface sensors 245 and 250, the torque data detected by the MWD torque sensor 255, and/or the WOB data detected by the MWD WOB sensor 260. The pressure differential data detected by the mud motor ΔP sensor 240 may alternatively (or additionally) be calculated, detected, or otherwise determined at the surface, such as by calculating the difference between the surface standpipe pressure just off-bottom and the pressure measured once the bit touches bottom and starts drilling and experiencing torque.

The BHA 170 may also include an MWD survey tool 265—in several embodiments, the MWD survey tool 265 is, includes, or is part of the MWD survey tool 170e shown in FIG. 1. The MWD survey tool 265 may be configured to perform surveys at intervals along the wellbore 160, such as during drilling and tripping operations. The MWD survey tool 265 may include one or more gamma ray sensors that detect gamma data. The data from these surveys may be transmitted by the MWD survey tool 265 to the control system 200 through various telemetry methods, such as mud pulse telemetry, electromagnetic telemetry, acoustic telemetry, the like, or any combination thereof. In other embodiments, survey data is collected and stored by the MWD survey tool 265 in an associated memory. This data may be uploaded to the control system 200 at a later time, such as when the MWD survey tool 265 is removed from the wellbore 160 or during maintenance. Some embodiments use alternative data gathering sensors or obtain information from other sources. For example, the BHA 170 may include sensors for making additional measurements, including, for example and without limitation, azimuthal gamma data, neutron density, porosity, and resistivity of surrounding formations. In several embodiments, such information may be obtained from third parties or may be measured by systems other than the BHA 170.

The BHA 170 may include a memory and a transmitter. In several embodiments, the memory and transmitter are integral parts of the MWD survey tool 265, while in other embodiments, the memory and transmitter are separate and distinct modules. The memory may be any type of memory device, such as a cache memory (e.g., a cache memory of the processor), random access memory (RAM), magneto-resistive RAM (MRAM), read-only memory (ROM), programmable read-only memory (PROM), erasable programmable read only memory (EPROM), electrically erasable programmable read only memory (EEPROM), flash memory, solid state memory device, hard disk drives, or other forms of volatile and non-volatile memory. The memory may be configured to store readings and measurements for some period of time. In several embodiments, the memory is configured to store the results of surveys performed by the MWD survey tool 265 for some period of time, such as the time between drilling connections, or until the memory may be downloaded after a tripping out operation. The transmitter may be any type of device to transmit data from the BHA 170 to the control system 200, and may include a mud pulse transmitter. In several embodiments, the MWD survey tool 265 is configured to transmit survey results in real-time to the surface through the transmitter. In other embodiments, the MWD survey tool 265 is configured to store survey results in the memory for a period of time, access the survey results from the memory, and transmit the results to the control system 200 through the transmitter.

In several embodiments, the BHA 170 also includes a control unit 270 for controlling the rotational position, speed, and direction of the rotary drilling bit or toolface. The control unit 270 may be, include, or be part of the control system 200, or another control system. The BHA 170 may also include other sensor(s) 275 such as, for example, other MWD sensors, other LWD sensors, other downhole sensors, back-up/redundant sensors, one or more sensors repurposed, repositioned, or reproduced from one or more of the top drive 135, the drawworks 130, and/or the mud pump(s) 180, and/or or any combination thereof.

The top drive 135 includes one or more sensors (typically a plurality of sensors) located and configured about the top drive 135 to detect parameters relating to the condition and orientation of the drill string 155, and/or other information. For example, the top drive 135 may include a rotary torque sensor 280, a quill position sensor 285, a hook load sensor 290, a pump pressure sensor 295, a mechanical specific energy ("MSE") sensor 300, and a rotary RPM sensor 305—in several embodiments, one or more of these sensors is, includes, or is part of the following sensor(s) shown in FIG. 1: the torque sensor 135a, the speed sensor 135b, the WOB sensor 135c, and/or the casing annular pressure sensor 195. In addition to, or instead of, being included as part of the drive system 135, the pump pressure sensor 295 may be included as part of the mud pump(s) 180. In several embodiments, the top drive 135 also includes a control unit 310 for controlling the rotational position, speed, and direction of the quill 145 and/or another component of the drill string 155 coupled to the top drive 135. The control unit 310 may be, include, or be part of the control system 200, or another control system. The top drive 135 may also include other sensor(s) 315 such as, for example, other top drive sensors, other surface sensors, back-up/redundant sensors, one or more sensors repurposed, repositioned, or reproduced from one or more of the BHA 170, the drawworks 130, and/or the mud pump(s) 180, and/or or any combination thereof.

The rotary torque sensor 280 is configured to detect a value (or range of values) for the reactive torsion of the quill 145 or the drill string 155. The quill position sensor 285 is configured to detect a value (or range of values) for the rotational position of the quill 145 (e.g., relative to true north or another stationary reference). The hook load sensor 290 is configured to detect the load on the hook 140 as it suspends the top drive 135 and the drill string 155. The pump pressure sensor 295 is configured to detect the pressure of the mud pump(s) 180 providing mud or otherwise powering the BHA 170 from the surface. In several embodiments, rather than being included as part of the top drive 135, the pump pressure sensor 295 may be incorporated into, or included as part of, the mud pump(s) 180. The MSE sensor 300 is configured to detect the MSE representing the amount of energy required per unit volume of drilled rock—in several embodiments, the MSE is not directly detected, but is instead calculated at the control system 200 (or another control system or control unit) based on sensed data. The rotary RPM sensor 305 is configured to detect the rotary RPM of the drill string 155—this may be measured at the top drive 135 or elsewhere (e.g., at surface portion of the drill string 155). The following data may be sent to the control system 200 via one or more signals, such as, for example, electronic signal via wired or wireless transmission: the rotary torque data detected by the rotary torque sensor 280, the quill position data detected by the quill position sensor 285, the hook load data detected by the hook load sensor 290, the pump pressure data detected by the pump pressure sensor 295, the MSE data detected (or calculated) by the MSE sensor 300, and/or the RPM data detected by the RPM sensor 305.

The mud pump(s) 180 may include a control unit 320 and/or other means for controlling the pressure and flow rate of the drilling mud produced by the mud pump(s) 180—such control may include torque and speed control of the mud pump(s) 180 to manipulate the pressure and flow rate of the drilling mud and the ramp-up or ramp-down rates of the mud pump(s) 180. In several embodiments, the control unit 320 is, includes, or is part of the control system 200. The mud pump(s) 180 may also include other sensor(s) 325 such as, for example, the pump pressure sensor 295, one or more pump flow sensors, other mud pump sensors, other surface sensors, back-up/redundant sensors, one or more sensors repurposed, repositioned, or reproduced from one or more of the BHA 170, the top drive 135, and/or the drawworks 130, and/or or any combination thereof.

The drawworks 130 may include a control unit 330 and/or other means for controlling feed-out and/or feed-in of the drilling line 125 (shown in FIG. 1)—such control may include rotational control of the drawworks to manipulate the height or position of the hook and the rate at which the hook ascends or descends. The drill string feed-off system of the drawworks 130 may instead be a hydraulic ram or rack and pinion type hoisting system rig, where the movement of the drill string 155 up and down is facilitated by something other than a drawworks. The drill string 155 may also take the form of coiled tubing, in which case the movement of the drill string 155 in and out of the wellbore 160 is controlled by an injector head which grips and pushes/pulls the tubing in/out of the wellbore 160. Such embodiments still include a version of the control unit 330 configured to control feed-out and/or feed-in of the drill string 155. In several embodiments, the control unit 330 is, includes, or is part of the control system 200. The drawworks 130 may also include other sensor(s) 335 such as, for example, other drawworks sensors, other surface sensors, back-up/redundant sensors, one or more sensors repurposed, repositioned, or reproduced from one or more of the BHA 170, the top drive 135, and/or the drawworks 130, and/or or any combination thereof.

The control system 200 may be configured to receive data or information relating to one or more of the above-described parameters from the user-interface 215, the BHA 170 (including the MWD survey tool 265), the top drive 135, the mud pump(s) 180, and/or the drawworks 130, as described above, and to utilize such information to enable effective and efficient drilling. In several embodiments, the parameters are transmitted to the control system 200 by one or more data channels. In several embodiments, each data channel may carry data or information relating to a particular sensor or combination of sensors. The control system 200 may be further configured to generate a control signal, such as via intelligent adaptive control, and provide the control signal to the top drive 135, the mud pump(s) 180, the drawworks 130, and/or the BHA 170 to adjust and/or maintain one or more of the following: the rotational position, speed, and direction of the quill 145 and/or another component of the drill string 155 coupled to the top drive 135, the pressure and flow rate of the drilling mud produced by the mud pump(s) 180, the feed-out and/or feed-in of the drilling line 125, and/or the rotational position, speed, and direction of the rotary drilling bit or toolface. Moreover, one or more of the control unit 270 of the BHA 170 the control unit 310 of the top drive 135, the control unit 320 of the mud pump(s) 180, and/or the control unit 330 of the drawworks 130 may be configured to generate and transmit signals to the control system 200—these signals influence the control of the BHA 170, the top drive 135, the mud pump(s) 180, and/or the drawworks 130. In addition, or instead, any one of the control units 270, 310, 320, and 330 may be configured to generate and transmit signals to another one of the control units 270, 310, 320, or 330, whether directly or via the control system 200—as a result, any combination of the control units 270, 310, 320, and 330 may be configured to cooperate in controlling the BHA 170, the top drive 135, the mud pump(s) 180, and/or the drawworks 130.

Referring to FIGS. 4A through 7C, with continuing reference to FIGS. 1-3, in an embodiment, in operation, the well system 100 described above is used to drill the wellbore 160 along a planned well path. The planned well path is developed prior to drilling based on formation characteristic(s) and known location(s) of any offset well(s). From this planned well path, the operator develops a "steering tunnel," which is an accumulation of steering windows, with each successive steering window being designed by the operator to have tolerances based on measured or expected formation characteristics at that location. More particularly, each steering window (defined by a rectangle) defines a tolerance area around the planned well path, indicating how far off the planned well path the operator is willing to go in each direction at each survey station (based on the particular drilling situation, the formation characteristics, etc.). For example, at a given survey station, and for a variety of reason(s), the operator may decide that the well shouldn't be more than 25 ft left or right of plan, 10 ft above plan, or 20 ft below plan. Once drilling has commenced, a directional survey of inclination and azimuth is taken by the survey tool (e.g., 170e or 265) approximately every 90 feet (after drilling down each stand); using the measured inclination and azimuth values together with the measured depth, the x, y, and z coordinates of each survey station are calculated. More particularly, the physical orientation of the survey station is determined from the inclination and azimuth measurements, while the direction (N, S, E, and/or W) from the rig floor and the depth from surface (z coordinate) are determined by incrementing and aggregating measurements from all previous survey stations, keeping in mind that the survey tool may be 30 to 50 feet behind the bit.

However, wellbore surveying is not an exact science, and multiple sources of errors contribute to the final calculated location of each survey station. For example, the wellbore surveying process can have errors with respect to the inclination and azimuth measurements (since these can only be measured with so much accuracy), as well as with the measured depth (due to stretch in the drill string). The summation of the impact of these errors can be represented by an ellipsoid around each survey station (shown as the central ellipsoid 340 in FIGS. 4A, 5A, 6A, and 7A, representing a survey station of the drilling well), sized according to the amount of uncertainty associated with the survey station. For example, the azimuth measurement at a particular survey station may have the largest error, as reflected by the major axis of the ellipsoid 340 being to the left and right as viewed in FIGS. 4A, 5A, 6A, and 7A; in such instance(s), the minor axis of the ellipsoid 340, which is to the top and bottom as viewed in FIGS. 4A, 5A, 6A, and 7A, indicates errors in the inclination measurement as being smaller than the corresponding errors due to the azimuth measurement. The "error" ellipsoid becomes larger the farther downhole the corresponding survey station is located. Additionally, the drilling process always involves unplanned trajectory deviations; during such deviations from the planned well path, anti-collision risks can increase. More particularly, since wellbore surveying errors are present in both the drilling well and any offset well(s), reducing anti-collision risks (especially during unplanned trajectory deviations from the planned well path) can quickly become complicated because the error on each well must be accounted for when developing a strategy of corrective steering action to reduce the probability of a collision.

The primary driver of anti-collision drilling decisions is separation factor; accordingly, operators set up rules and warnings based on separator factor values. The separation factor calculation between the drilling well and an offset well is influenced by the edge-to-edge distance between the two error ellipsoids, with the first ellipsoid being associated with a survey station of the drilling well, and the second ellipsoid being associated with the nearest survey station of the offset well. From this, the "separation factor," which is a risk calculation that helps operators decide whether to stop drilling, can be calculated. For example, the separation factor may be calculated using a "pedal curve" method, in which the center-to-center distance between two survey stations of the drilling well and an offset well is divided by the sum of a first radius (of the drilling well's error ellipsoid in a first direction towards the central axis of the offset well) and a second radius (of the offset well's error ellipsoid in a second direction, opposite the first direction, toward the central axis of the drilling well). In such instance(s), as the separation factor approaches 1, the anti-collision risk increases. The objective of the operator is to keep the separation factor above any critical values, which may vary depending on specific formation characteristics, as defined by the operator.

The present disclosure introduces steering logic that is simultaneously driven by two (2) goals. The first goal is to remain inside the steering tunnel created in proximity to the directional well plan. The second goal is to remain compliant with the operator's anti-collision policy, and to adhere to separation factor rules while drilling. The inclusion of anti-collision data in the steering logic poses challenges, which are addressed by the system(s) and method(s) disclosed herein to adjust steering advisories (drilldowns) accordingly, as will be described in further detail below in connection with FIGS. 4A through 7C.

Figure 4A:
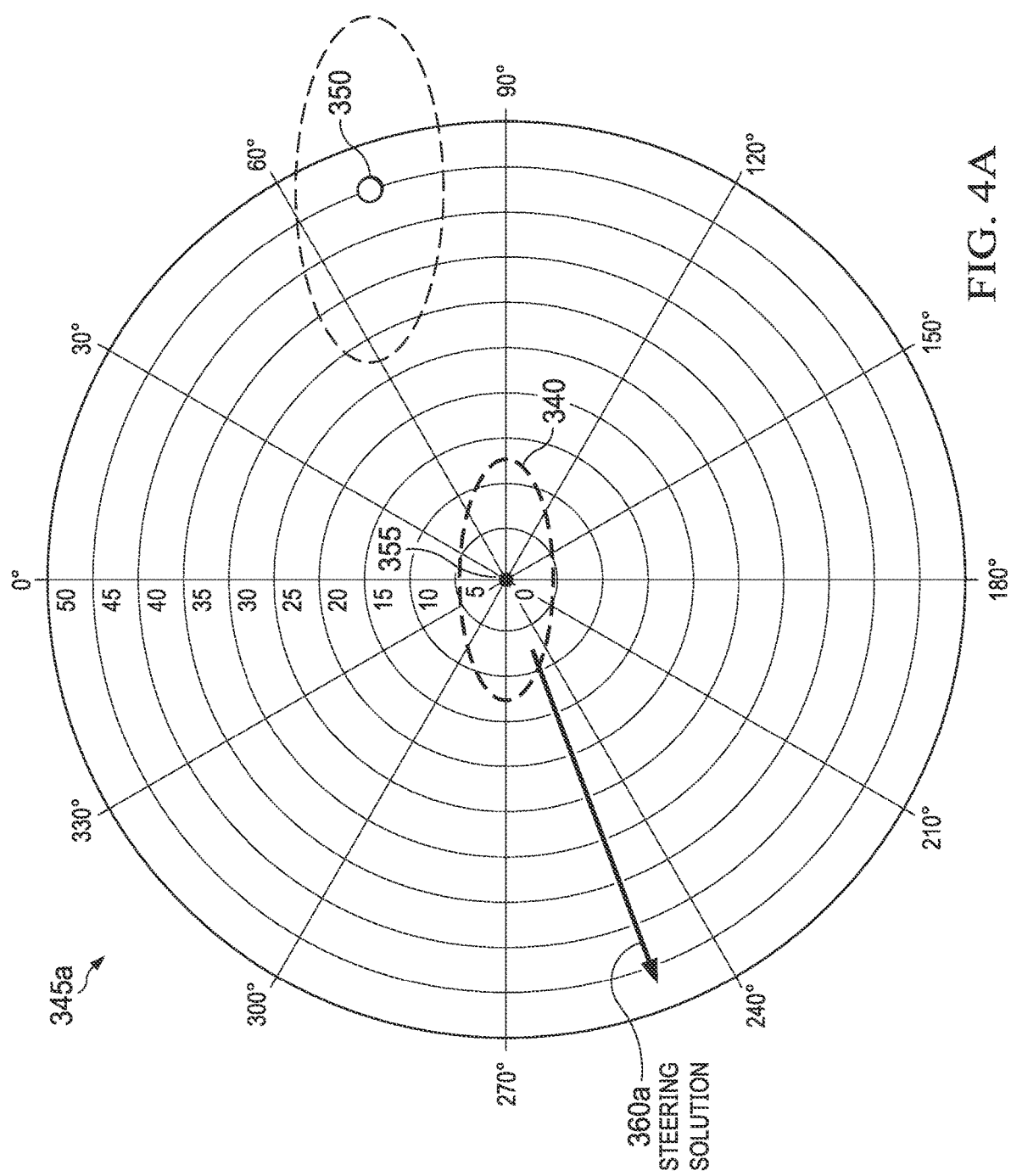
FIG. 4A is a diagrammatic view of a first anti-collision scenario, in which an offset well is closing onto a drilling well, according to one or more embodiments.
Figure 4B:
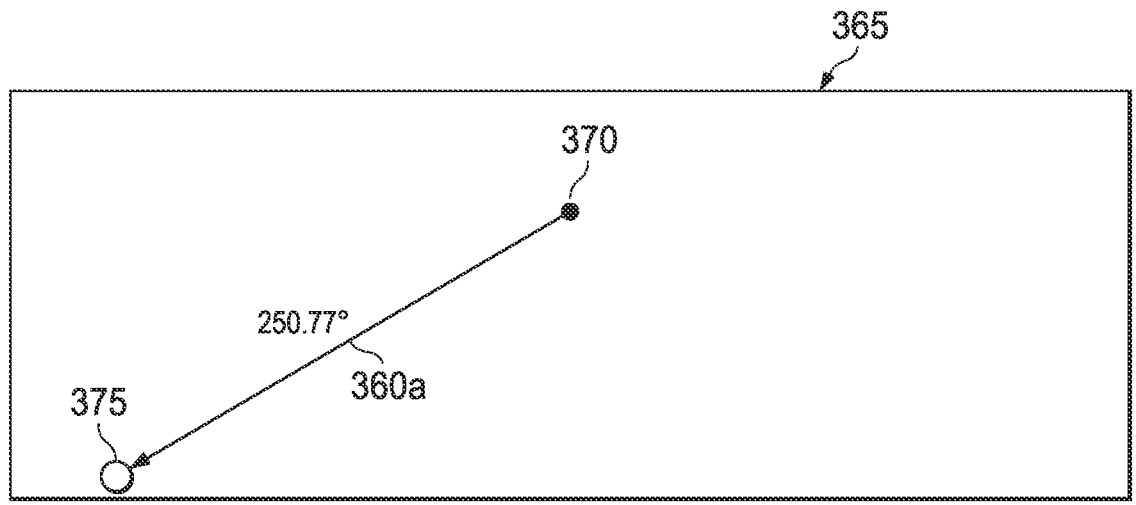
FIG. 4B is a diagrammatic illustration of a first anti-collision strategy associated with the first anti-collision scenario illustrated in FIG. 4A, according to one or more embodiments.

Referring in particular to FIGS. 4A and 4B, for example, in an embodiment, a first anti-collision scenario 345a, in which an offset well 350 is closing from one side onto a drilling well 355, and an associated anti-collision steering strategy 360a (incorporating the steering logic introduced by the present disclosure) are illustrated. More particularly, the first anti-collision scenario 345a is illustrated in FIG. 4A through the use of travelling cylinder plots of both the drilling well 355 and the offset well 350, with the drilling well 355 illustrated at center and with the point-of-view (POV) facing downhole with respect to the drilling well. As shown in FIG. 4A, the offset well 350 is 45.5 ft away at an angle (a toolface angle, or TF) of 70.77 degrees. In this scenario, which presents only a single-sided anti-collision risk, the steering strategy 360a is to steer at 70.77+180 degrees away from the closing offset well 350. In other words, the drilldown would instruct the operator to drill on 250.77 degrees in the toolface plane.

As shown in FIG. 4B, this is achieved using a steering solution (e.g., a 3DJ solution) and shifting the drilldown objective coordinates in the direction of the steering solution, all while staying within the relevant steering window 365 (and thus also within the pre-defined drilling tunnel created by the operator). The original steering objective is thus shifted to (or near) the edge of the steering window 365 at a point +450 ft ahead of the current bottom hole location. In this instance, the steering window 365 is represented in FIG. 4B as a rectangle at +450 ft ahead of the bottom hole location at survey time, the original objective coordinates prior to shifting the drilldown objective coordinates are represented by dot 370, and the shifted anti-collision objective coordinates for the steering solution are represented by dot 375.

Figure 5B:
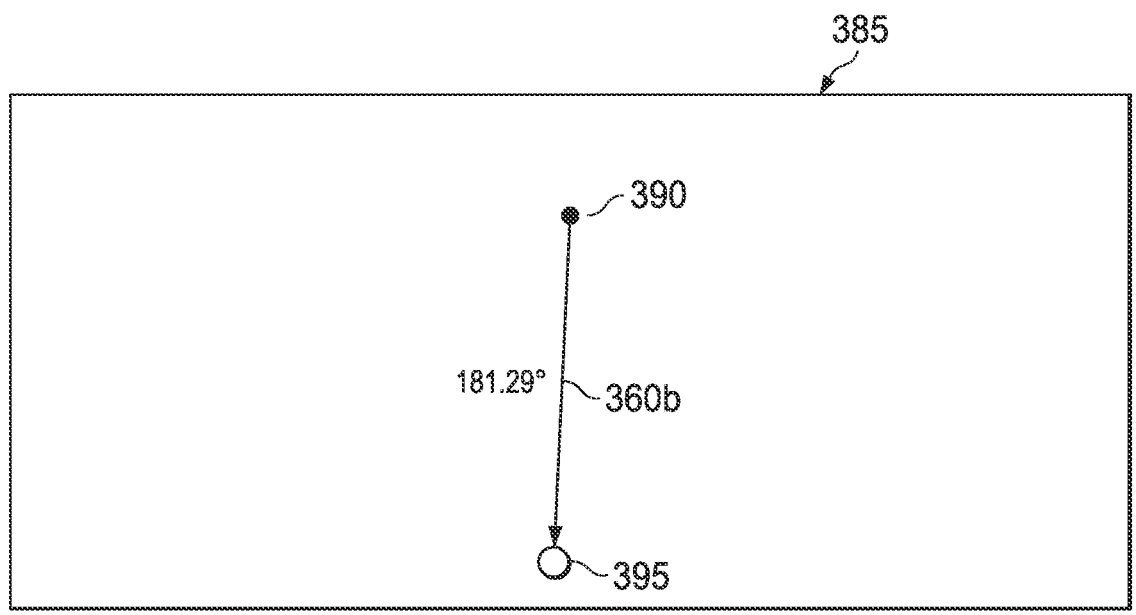
FIG. 5B is a diagrammatic illustration of a second anti-collision strategy associated with the second anti-collision scenario illustrated in FIG. 5A, according to one or more embodiments.
Figure 5A:
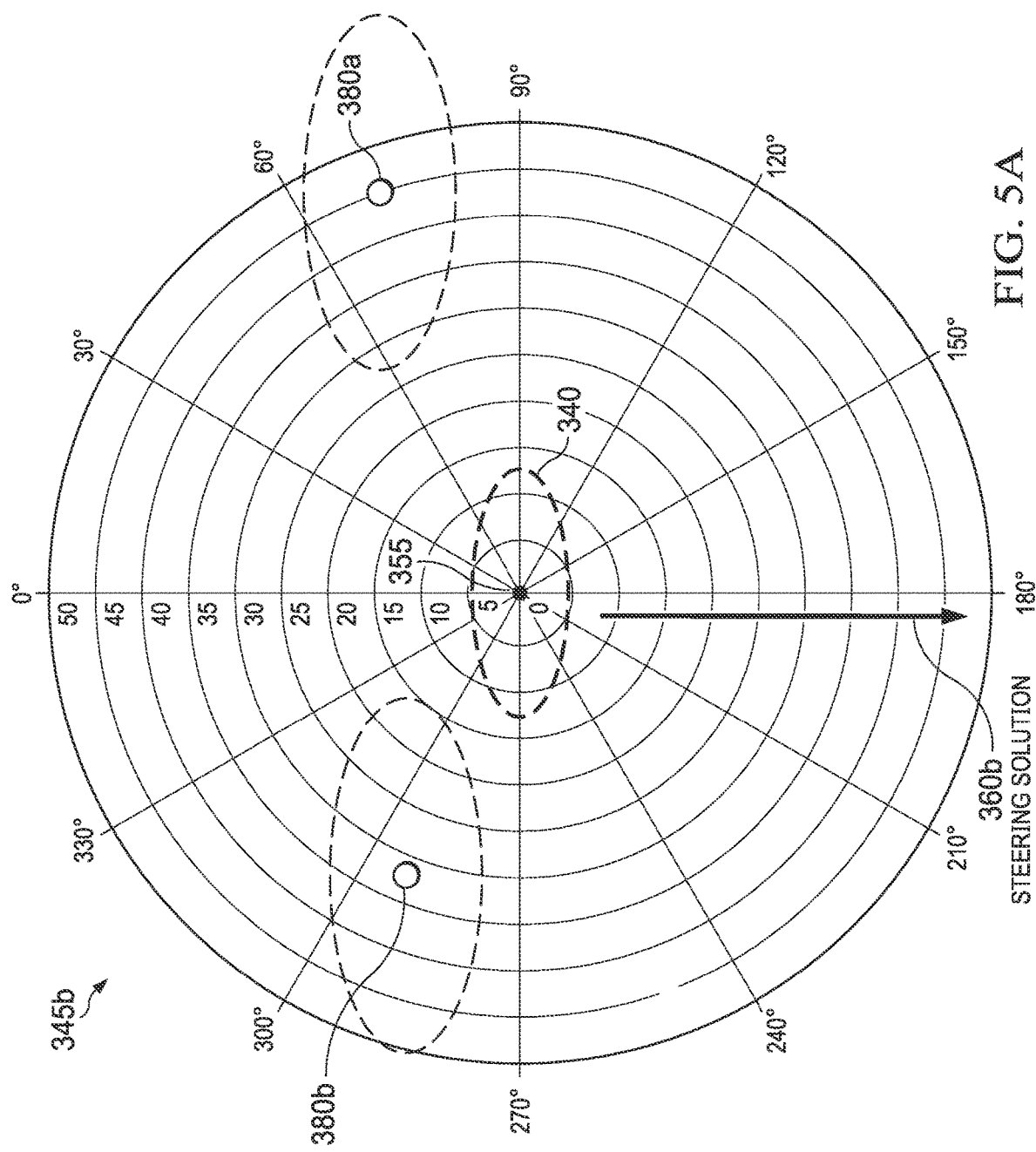
FIG. 5A is a diagrammatic view of a second anti-collision scenario, in which two (2) offset wells are closing onto the drilling well, according to one or more embodiments.

Referring in particular to FIGS. 5A and 5B, for another example, in an embodiment, a second anti-collision scenario 345b and an associated anti-collision strategy 360b (incorporating the steering logic introduced by the present disclosure) are illustrated. In the second anti-collision scenario 345b, offset wells 380a-b are closing onto the drilling well 355, with the offset well 380a closing from one side and the offset well 380b closing from the other side. More particularly, as shown in FIG. 5A, the offset well 380a is 45.5 ft away at a TF angle of 70.77 degrees, and the offset well 380b is 32.3 ft away at a TF angle of −68.2 degrees. In this scenario, which presents two-sided anti-collision risk, a direction to move away from both of these potentially dangerous offset wells 380a-b can be found by adding 180 degrees to the average of the TF angles to the offset wells 380a-b. In other words, the drilldown would instruct the operator to drill on 180+(70.77-68.2)/2, or 181.285 degrees, in the toolface plane to reduce the anti-collision risk from both offset wells 380a-b.

As shown in FIG. 5B, this is achieved using a steering solution (e.g., a 3DJ solution) and shifting the drilldown objective coordinates in the direction of the steering solution, all while staying within the relevant steering window 385 (and thus also within the pre-defined drilling tunnel created by the operator). The original steering objective is thus shifted to (or near) the edge of the steering window 385 at a point +450 ft ahead of the current bottom hole location. In this instance, the steering window 385 is represented in FIG. 5B as a rectangle at +450 ft ahead of the bottom hole location at survey time, the original objective coordinates prior to shifting the drilldown objective coordinates are represented by dot 390, and the shifted anti-collision objective coordinates for the steering solution are represented by dot 395.

Figure 6A:
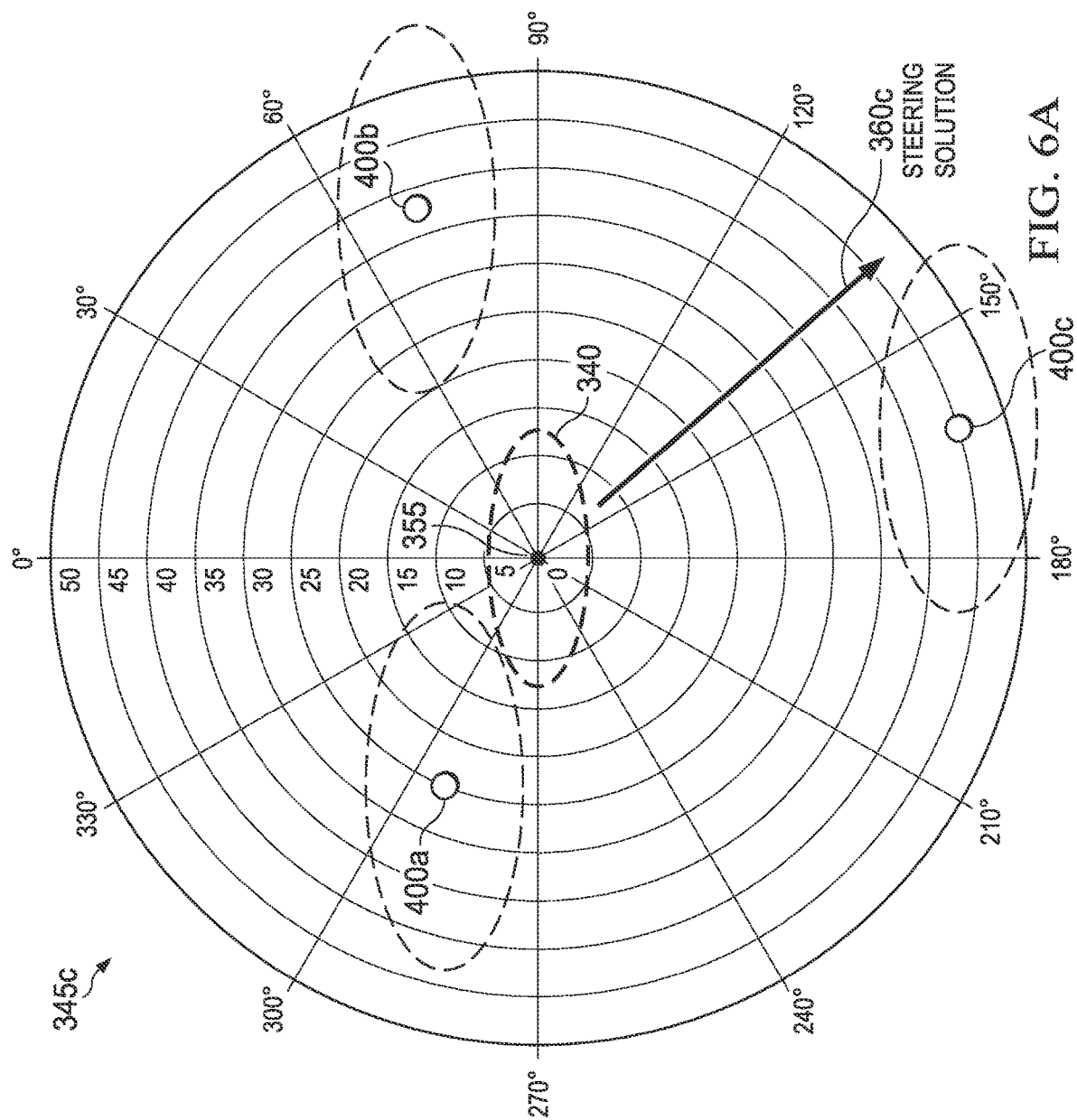
FIG. 6A is a diagrammatic view of a third anti-collision scenario, in which three (3) offset wells are closing onto the drilling well, according to one or more embodiments.
Figure 6B:
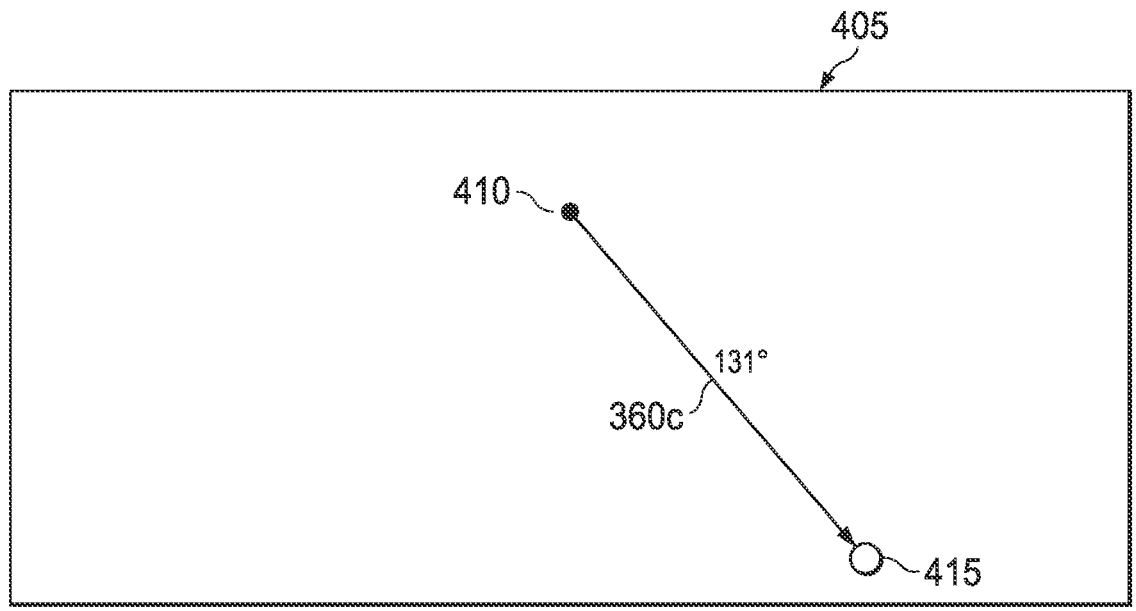
FIG. 6B is a diagrammatic illustration of a third anti-collision strategy associated with the third anti-collision scenario illustrated in FIG. 6A, according to one or more embodiments.

Referring in particular to FIGS. 6A and 6B, for yet another example, in an embodiment, a third anti-collision scenario 345c and an associated anti-collision strategy 360c (incorporating the steering logic introduced by the present disclosure) are illustrated. In the third anti-collision scenario 345c, offset wells 400a-c are closing onto the drilling well 355, with the offset well 400a closing from one side and the offset wells 400b-c closing from the other side. More particularly, as shown in FIG. 6A, the offset well 400b is 45.5 ft away at a TF angle of 70.77 degrees, the offset well 400c is 54 ft away at a TF angle of 164 degrees, and the offset well 400a is 32.3 ft away at a TF angle of −68.2 degrees. In this scenario, which presents three-sided anti-collision risk, the best that can be done is to move as far away as possible from all of the closing offset wells 400a-c, which is achieved by moving geometrically into the centroid of the triangle formed by the three (3) closing offset wells 400a-c. In other words, the drilldown would instruct the operator to drill on 131 degrees in the toolface plane to reduce the anti-collision risk from all three (3) offset wells.

As shown in FIG. 6B, this is achieved using a steering solution (e.g., a 3DJ solution) and shifting the drilldown objective coordinates in the direction of the steering solution, all while staying within the relevant steering window 405 (and thus also within the pre-defined drilling tunnel created by the operator). The original steering objective is thus shifted to (or near) the edge of the steering window 405 at a point +450 ft ahead of the current bottom hole location. In this instance, the steering window 405 is represented in FIG. 6B as a rectangle at +450 ft ahead of the bottom hole location at survey time, the original objective coordinates prior to shifting the drilldown objective coordinates are represented by dot 410, and the shifted anti-collision objective coordinates for the steering solution are represented by dot 415.

Figure 7C:
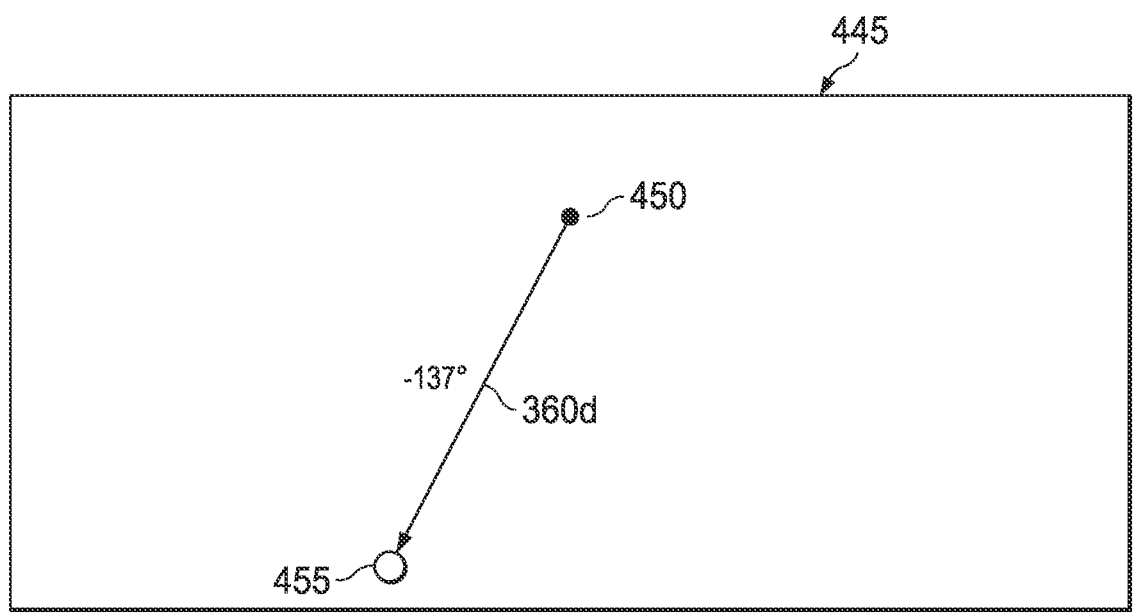
FIG. 7C is a diagrammatic illustration of a fourth anti-collision strategy developed from the centroid solution of FIG. 7B and associated with the fourth anti-collision scenario illustrated in FIG. 7A, according to one or more embodiments.

Referring in particular to FIGS. 7A through 7C, for yet another example, in an embodiment, a fourth anti-collision scenario 345d and an associated anti-collision strategy 360d (incorporating the steering logic introduced by the present disclosure) are illustrated. In the fourth anti-collision scenario 345d, offset wells 420a-e are closing onto the drilling well 355, with the offset wells 420a-c closing from one side and the offset wells 420d-e closing from the other side. More particularly, as shown in FIG. 7A: the offset wells 420d-e are closing from the right, with the offset well 420d being 45.5 ft away at a TF angle of 70.77 degrees, and the offset well 420e being 54 ft away at a TF angle of 164 degrees; and the offset wells 420a-c are closing from the left, with the offset well 420a being 42.7 ft away at a TF angle of −20.5 degrees, the offset well 420b being 49 ft away at a TF angle of −59 degrees, and the offset well 420c being 64 ft away at a TF angle of −128 degrees. In this scenario, which presents five-sided anti-collision risk, the best that can be done is to again move as far away as possible from all of the closing offset wells 420a-e, which is achieved by moving geometrically into a centroid 425 of a polygon 430 formed by the five (5) closing offset wells 420a-e. This centroid solution 435, which maximizes the distances to all vertices, is shown in FIG. 7B for clarity, with the dots 440a-e representing the offset wells 420a-e, respectively, and the centroid 425 representing the location of the calculated centroid relative to the drilling well 355. In other words, the drilldown would instruct the operator to drill on −137 degrees in the toolface plane to reduce the anti-collision risk from all five (5) of the offset wells 420a-e.

As shown in FIG. 7C, this is achieved using a steering solution (e.g., a 3DJ solution) and shifting the drilldown objective coordinates in the direction of the steering solution, all while staying within the relevant steering window 445 (and thus also within the pre-defined drilling tunnel created by the operator). The original steering objective is thus shifted to (or near) the edge of the steering window 445 at a point +450 ft ahead of the current bottom hole location. In this instance, the steering window 445 is represented in FIG. 7C as a rectangle at +450 ft ahead of the bottom hole location at survey time, the original objective coordinates prior to shifting the drilldown objective coordinates are represented by dot 450, and the shifted anti-collision objective coordinates for the steering solution are represented by dot 455.

The anti-collision steering strategies 360a-d described above are aimed at shifted steering objectives at the +450 ft ahead steering window; however, more (or less) aggressive steering corrections may be achieved by aiming the anti-collision steering strategies 360a-d discussed herein at shifted steering objectives at closed distances, for example, at the +250 ft ahead steering window. The decision to use a more (or less) aggressive steering correction can be driven by warning levels placed in effect by the operator. Additionally, although the steering windows are shown described herein as defining rectangles, one or more of the steering windows may define any another shape, such as, for example, another polygon, a circle, an oval, a rounded rectangle, another rounded polygon, another shape, the like, or any combination thereof.

Figure 8:
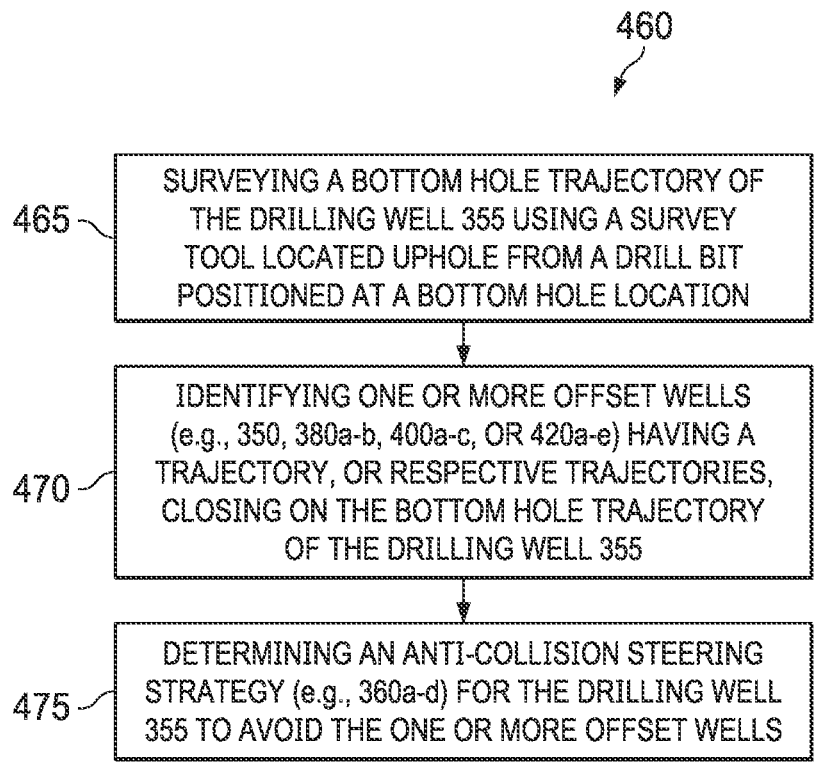
FIG. 8 is a flow diagram of a method for implementing one or more embodiments of the present disclosure.

Referring to FIG. 8, a method for reducing anti-collision risk between a drilling well and one or more offset wells is generally referred to by the reference numeral 460. The method 460 includes, at a step 465, surveying a bottom hole trajectory of the drilling well 355 using a survey tool located uphole from a drill bit positioned at a bottom hole location. At a step 470, one or more offset wells (e.g., 350, 380a-b, 400a-c, or 420a-e) having a trajectory, or respective trajectories, closing on the bottom hole trajectory of the drilling well 355 are identified. In one or more embodiments, identifying the one or more offset wells includes identifying a first offset well (e.g., 350, 380a, 400a, or 420a). Further, in one or more embodiments, identifying the one or more offset wells further includes identifying a second offset well (e.g., 380b, 400b, or 420b). Further still, in one or more embodiments, identifying the one or more offset wells further includes identifying one or more third offset wells (e.g., 400c pr 420c-e).

Finally, at a step 475, an anti-collision steering strategy (e.g., 360a-d) for the drilling well 355 to avoid the one or more offset wells is determined. In one or more embodiments, determining the anti-collision steering strategy for the drilling well to avoid the one or more offset wells includes determining a steering advisory based on a first distance and a first toolface angle of the first offset well relative to the drilling well in a plane intersecting both the drilling well and the first offset well. For example, determining the steering advisory may include adding 180 degrees to the first toolface angle, as described above in connection with FIGS. 4A and 4B. In one or more embodiments, determining the anti-collision steering strategy for the drilling well to avoid the one or more offset wells further includes moving, within a steering window and based on the steering advisory, a steering objective of the drilling well, said steering window being positioned ahead of the bottom hole location of the drilling well. For example, moving, within the steering window and based on the steering advisory, a steering objective of the drilling well, includes moving the steering object to an edge of the steering window.

In one or more embodiments, the steering advisory is further determined based on a second distance and a second toolface angle of the second offset well relative to the drilling well in the plane, which plane also intersects the second offset well. For example, determining the steering advisory may include adding 180 degrees to an average of the first toolface angle and the second toolface angle, as described above in connection with FIGS. 5A and 5B. In one or more embodiments, the steering advisory is further determined based on a third distance, or respective third distances, and a third toolface angle, or respective third toolface angles, of the one or more third offset wells relative to the drilling well in the plane, which plane also intersects the one or more third offset wells. More particularly, the first well, the second well, and the one or more third wells may together define a polygon, which polygon has a centroid, and determining the steering advisory may include determining if the drilling well is contained within a perimeter of the polygon. For example, determining the steering advisory may further include, in response to determining that the drilling well is contained within the perimeter of the polygon, calculating an angular direction of the centroid relative to the drilling well in the plane, which plane also contains the centroid, as described above in connection with FIGS. 6A-B and 7A-C. For another example, determining the steering advisory may further include, in response to determining that the drilling well is not contained within the perimeter of the polygon, adding 180 degrees to an average of the first toolface angle, the second toolface angle, and the third toolface angle or the respective third toolface angles.

In one or more embodiments, the operation of the system 100 and/or the execution of the method 460 eliminates the need for an operator to manually project wellbore trajectory with anti-collision risk consideration. In addition, or instead, in one or more embodiments, the operation of the system 100 and/or the execution of the method 460 automatically optimizes the well path trajectory in avoiding anti-collision risk and steering within the tolerance window and equipment constraints.

Figure 9:
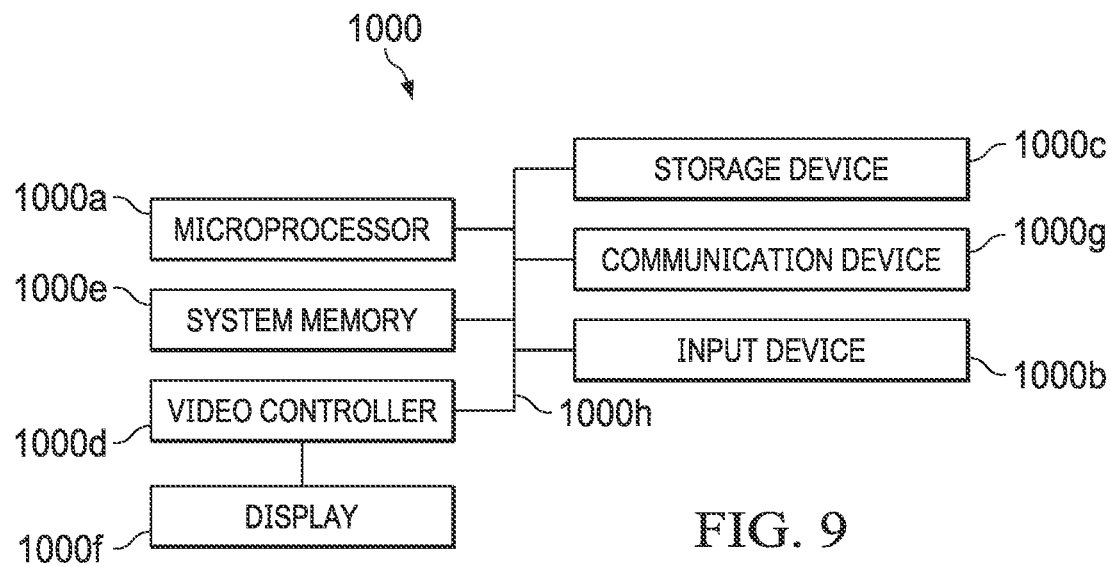
FIG. 9 is a diagrammatic illustration of a computing node for implementing one or more embodiments of the present disclosure.

Referring to FIG. 9, with continuing reference to FIGS. 1 through 8, in one or more embodiments, a computing node 1000 for implementing one or more embodiments of one or more of the above-described element(s), component(s), system(s), apparatus, method(s), step(s), and/or control unit(s) (such as, for example, the control unit(s) shown and described in connection with FIG. 2), and/or any combination thereof, is depicted. The node 1000 includes a microprocessor 1000a, an input device 1000b, a storage device 1000c, a video controller 1000d, a system memory 1000e, a display 1000f, and a communication device 1000g all interconnected by one or more buses 1000h. In one or more embodiments, the microprocessor 1000a is, includes, or is part of, the control system 200 and/or the one or more other control units described herein in connection with FIG. 2. In one or more embodiments, the storage device 1000c may include a floppy drive, hard drive, CD-ROM, optical drive, any other form of storage device or any combination thereof. In one or more embodiments, the storage device 1000c may include, and/or be capable of receiving, a floppy disk, CD-ROM, DVD-ROM, or any other form of computer-readable medium that may contain executable instructions. In one or more embodiments, the communication device 1000g may include a modem, network card, or any other device to enable the node 1000 to communicate with other nodes. In one or more embodiments, any node represents a plurality of interconnected (whether by intranet or Internet) computer systems, including without limitation, personal computers, mainframes, PDAs, smartphones and cell phones.

In one or more embodiments, one or more of the components of any of the above-described systems include at least the node 1000 and/or components thereof, and/or one or more nodes that are substantially similar to the node 1000 and/or components thereof. In one or more embodiments, one or more of the above-described components of the node 1000 and/or the above-described systems include respective pluralities of same components.

In one or more embodiments, a computer system typically includes at least hardware capable of executing machine readable instructions, as well as the software for executing acts (typically machine-readable instructions) that produce a desired result. In one or more embodiments, a computer system may include hybrids of hardware and software, as well as computer sub-systems.

In one or more embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In one or more embodiments, hardware may include any physical device that is capable of storing machine-readable instructions, such as memory or other data storage devices. In one or more embodiments, other forms of hardware include hardware sub-systems, including transfer devices such as modems, modem cards, ports, and port cards, for example.

In one or more embodiments, software includes any machine code stored in any memory medium, such as RAM or ROM, and machine code stored on other devices (such as floppy disks, flash memory, or a CD ROM, for example). In one or more embodiments, software may include source or object code. In one or more embodiments, software encompasses any set of instructions capable of being executed on a node such as, for example, on a client machine or server.

In one or more embodiments, combinations of software and hardware could also be used for providing enhanced functionality and performance for certain embodiments of the present disclosure. In one or more embodiments, software functions may be directly manufactured into a silicon chip. Accordingly, combinations of hardware and software are also included within the definition of a computer system and are thus envisioned by the present disclosure as possible equivalent structures and equivalent methods.

In one or more embodiments, computer readable mediums include, for example, passive data storage, such as a random-access memory (RAM) as well as semi-permanent data storage such as a compact disk read only memory (CD-ROM). One or more embodiments of the present disclosure may be embodied in the RAM of a computer to transform a standard computer into a new specific computing machine. In one or more embodiments, data structures are defined organizations of data that may enable one or more embodiments of the present disclosure. In one or more embodiments, data structure may provide an organization of data, or an organization of executable code.

In one or more embodiments, any networks and/or one or more portions thereof, may be designed to work on any specific architecture. In one or more embodiments, one or more portions of any networks may be executed on a single computer, local area networks, client-server networks, wide area networks, internets, hand-held and other portable and wireless devices and networks.

In one or more embodiments, database may be any standard or proprietary database software. In one or more embodiments, the database may have fields, records, data, and other database elements that may be associated through database specific software. In one or more embodiments, data may be mapped. In one or more embodiments, mapping is the process of associating one data entry with another data entry. In one or more embodiments, the data contained in the location of a character file can be mapped to a field in a second table. In one or more embodiments, the physical location of the database is not limiting, and the database may be distributed. In one or more embodiments, the database may exist remotely from the server, and run on a separate platform. In one or more embodiments, the database may be accessible across the Internet. In one or more embodiments, more than one database may be implemented.

In one or more embodiments, a plurality of instructions stored on a non-transitory computer readable medium may be executed by one or more processors to cause the one or more processors to carry out or implement in whole or in part the above-described operation of each of the above-described element(s), component(s), system(s), apparatus, method(s), step(s), and/or control unit(s) (such as, for example, the control unit(s) shown and described in connection with FIG. 2), and/or any combination thereof.

In one or more embodiments, such a processor may be or include one or more of the microprocessor 1000a, one or more control units (such as, for example, the control unit(s) shown and described in connection with FIG. 2), one or more other controllers, any processor(s) that are part of the components of the above-described systems, and/or any combination thereof, and such a computer readable medium may be distributed among one or more components of the above-described systems. In one or more embodiments, such a processor may execute the plurality of instructions in connection with a virtual computer system. In one or more embodiments, such a plurality of instructions may communicate directly with the one or more processors, and/or may interact with one or more operating systems, middleware, firmware, other applications, and/or any combination thereof, to cause the one or more processors to execute the instructions.

A method has been disclosed. The method generally includes: surveying a bottom hole trajectory of a drilling well using a survey tool located uphole from a drill bit positioned at a bottom hole location; identifying one or more offset wells having a trajectory, or respective trajectories, closing on the bottom hole trajectory of the drilling well; and determining an anti-collision steering strategy for the drilling well to avoid the one or more offset wells, wherein identifying the one or more offset wells includes identifying a first offset well, and wherein determining the anti-collision steering strategy for the drilling well to avoid the one or more offset wells includes: determining a steering advisory based on a first distance and a first toolface angle of the first offset well relative to the drilling well in a plane intersecting both the drilling well and the first offset well. In one or more embodiments, determining the steering advisory includes adding 180 degrees to the first toolface angle. In one or more embodiments, identifying the one or more offset wells further includes identifying a second offset well, and the steering advisory is further determined based on a second distance and a second toolface angle of the second offset well relative to the drilling well in the plane, which plane also intersects the second offset well. In one or more embodiments, determining the steering advisory includes adding 180 degrees to an average of the first toolface angle and the second toolface angle. In one or more embodiments, identifying the one or more offset wells further includes identifying one or more third offset wells, and the steering advisory is further determined based on a third distance, or respective third distances, and a third toolface angle, or respective third toolface angles, of the one or more third offset wells relative to the drilling well in the plane, which plane also intersects the one or more third offset wells. In one or more embodiments, the first well, the second well, and the one or more third wells together define a polygon, which polygon has a centroid, and determining the steering advisory includes: determining if the drilling well is contained within a perimeter of the polygon. In one or more embodiments, determining the steering advisory further includes: in response to determining that the drilling well is contained within the perimeter of the polygon, calculating an angular direction of the centroid relative to the drilling well in the plane, which plane also contains the centroid. In one or more embodiments, determining the steering advisory further includes: in response to determining that the drilling well is not contained within the perimeter of the polygon, adding 180 degrees to an average of the first toolface angle, the second toolface angle, and the third toolface angle or the respective third toolface angles. In one or more embodiments, determining the anti-collision steering strategy for the drilling well to avoid the one or more offset wells further includes: moving, within a steering window and based on the steering advisory, a steering objective of the drilling well, said steering window being positioned ahead of the bottom hole location of the drilling well. In one or more embodiments, moving, within the steering window and based on the steering advisory, a steering objective of the drilling well, includes moving the steering object to an edge of the steering window.

An apparatus has also been disclosed. The apparatus generally includes: a non-transitory computer readable medium; and a plurality of instructions stored on the non-transitory computer readable medium and executable by one or more processors, wherein, when the instructions are executed by the one or more processors, the following steps are executed: surveying a bottom hole trajectory of a drilling well using a survey tool located uphole from a drill bit positioned at a bottom hole location; identifying one or more offset wells having a trajectory, or respective trajectories, closing on the bottom hole trajectory of the drilling well; and determining an anti-collision steering strategy for the drilling well to avoid the one or more offset wells, wherein identifying the one or more offset wells includes identifying a first offset well, and wherein determining the anti-collision steering strategy for the drilling well to avoid the one or more offset wells includes: determining a steering advisory based on a first distance and a first toolface angle of the first offset well relative to the drilling well in a plane intersecting both the drilling well and the first offset well. In one or more embodiments, determining the steering advisory includes adding 180 degrees to the first toolface angle. In one or more embodiments, identifying the one or more offset wells further includes identifying a second offset well, and the steering advisory is further determined based on a second distance and a second toolface angle of the second offset well relative to the drilling well in the plane, which plane also intersects the second offset well. In one or more embodiments, determining the steering advisory includes adding 180 degrees to an average of the first toolface angle and the second toolface angle. In one or more embodiments, identifying the one or more offset wells further includes identifying one or more third offset wells, and the steering advisory is further determined based on a third distance, or respective third distances, and a third toolface angle, or respective third toolface angles, of the one or more third offset wells relative to the drilling well in the plane, which plane also intersects the one or more third offset wells. In one or more embodiments, the first well, the second well, and the one or more third wells together define a polygon, which polygon has a centroid, and determining the steering advisory includes: determining whether the drilling well is contained within a perimeter of the polygon. In one or more embodiments, determining the steering advisory further includes: in response to determining that the drilling well is contained within the perimeter of the polygon, calculating an angular direction of the centroid relative to the drilling well in the plane, which plane also contains the centroid. In one or more embodiments, determining the steering advisory further includes: in response to determining that the drilling well is not contained within the perimeter of the polygon, adding 180 degrees to an average of the first toolface angle, the second toolface angle, and the third toolface angle or the respective third toolface angles. In one or more embodiments, determining the anti-collision steering strategy for the drilling well to avoid the one or more offset wells further includes: moving, within a steering window and based on the steering advisory, a steering objective of the drilling well, said steering window being positioned ahead of the bottom hole location of the drilling well. In one or more embodiments, moving, within the steering window and based on the steering advisory, a steering objective of the drilling well, includes moving the steering object to an edge of the steering window.

It is understood that variations may be made in the foregoing without departing from the scope of the present disclosure.

In one or more embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In one or more embodiments, while different steps, processes, and procedures are described as appearing as distinct acts, one or more of the steps, one or more of the processes, and/or one or more of the procedures may also be performed in different orders, simultaneously and/or sequentially. In one or more embodiments, the steps, processes, and/or procedures may be merged into one or more steps, processes and/or procedures.

In one or more embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A method, comprising:
   surveying a bottom hole trajectory of a drilling well using a survey tool located uphole from a drill bit positioned at a bottom hole location while a drilling rig performs a drilling process on a drill string to extend the drilling well, the drill bit being operably coupled at an end portion of a drill string extending into the drilling well from a drilling rig, and the drilling rig being adapted to perform a drilling process on the drill string to extend the drilling well;
   identifying three or more offset wells having respective trajectories in a vicinity of the surveyed bottom hole trajectory of the drilling well,
      wherein identifying the three or more offset wells comprises identifying respective coordinate positions of a first offset well, a second offset well, and one or more third offset wells in a plane intersecting the drilling well;
   determining an anti-collision steering strategy for the drilling well to avoid the three or more offset wells,
      wherein determining the anti-collision steering strategy for the drilling well to avoid the three or more offset wells comprises:
         determining a steering advisory; and
         visualizing the steering advisory on a display unit operably associated with the drilling rig;
   and
   performing, using the drilling rig and based on the steering advisory visualized on the display unit operably associated with the drilling rig, the drilling process to extend the drilling well,
      wherein the respective identified coordinate positions of the first offset well, the second offset well, and the one or more third offset wells in the plane together define respective vertices of a polygon, said polygon having a centroid,
      and
      wherein determining the steering advisory comprises:
         calculating, based on the surveyed bottom hole trajectory of the drilling well, a coordinate position of the drilling well in the plane;
         identifying the centroid of the polygon; and
         determining an angular direction of the centroid of the polygon relative to the coordinate position of the drilling well in the plane.

2. The method of claim 1,
   wherein determining the anti-collision steering strategy for the drilling well to avoid the three or more offset wells further comprises:
      moving, within a steering window and based on the steering advisory, a steering objective of the drilling well, said steering window being positioned ahead of the bottom hole location of the drilling well.

3. The method of claim 2, wherein moving, within the steering window and based on the steering advisory, the steering objective of the drilling well, comprises moving the steering objective to an edge of the steering window.

4. An apparatus, comprising:
a non-transitory computer readable medium; and
a plurality of instructions stored on the non-transitory computer readable medium and executable by one or more processors, wherein, when the instructions are executed by the one or more processors, the following steps are executed:
surveying a bottom hole trajectory of a drilling well using a survey tool located uphole from a drill bit positioned at a bottom hole location while a drilling rig performs a drilling process on a drill string to extend the drilling well, the drill bit being operably coupled at an end portion of a drill string extending into the drilling well from a drilling rig, and the drilling rig being adapted to perform a drilling process on the drill string to extend the drilling well;
identifying three or more offset wells having respective trajectories in a vicinity of the surveyed bottom hole trajectory of the drilling well,
wherein identifying the three or more offset wells comprises identifying respective coordinate positions of a first offset well, a second offset well, and one or more third offset wells in a plane intersecting the drilling well;
determining an anti-collision steering strategy for the drilling well to avoid the three or more offset wells,
wherein determining the anti-collision steering strategy for the drilling well to avoid the three or more offset wells comprises:
determining a steering advisory; and
visualizing the steering advisory on a display unit operably associated with the drilling rig;
and
performing, using the drilling rig and based on the steering advisory visualized on the display unit operably associated with the drilling rig, the drilling process to extend the drilling well,
wherein the respective identified coordinate positions of the first offset well, the second offset well, and the one or more third offset wells in the plane together define respective vertices of a polygon, said polygon having a centroid, and
wherein determining the steering advisory comprises:
calculating, based on the surveyed bottom hole trajectory of the drilling well, a coordinate position of the drilling well in the plane;
identifying the centroid of the polygon; and
determining an angular direction of the centroid of the polygon relative to the coordinate position of the drilling well in the plane.

5. The apparatus of claim 4,
wherein determining the anti-collision steering strategy for the drilling well to avoid the three or more offset wells further comprises:
moving, within a steering window and based on the steering advisory, a steering objective of the drilling well, said steering window being positioned ahead of the bottom hole location of the drilling well.

6. The apparatus of claim 5, wherein moving, within the steering window and based on the steering advisory, the steering objective of the drilling well, comprises moving the steering objective to an edge of the steering window.

7. The method of claim 1, wherein determining the steering advisory further comprises:
determining if the calculated coordinate position of the drilling well in the plane is contained within the polygon; and
either:
in response to determining that the calculated coordinate position of the drilling well in the plane is contained within a perimeter of the polygon, establishing the steering advisory towards the angular direction of the centroid of the polygon relative to the calculated coordinate position of the drilling well in the plane; or
in response to determining that the calculated coordinate position of the drilling well in the plane is not contained within the perimeter of the polygon, establishing the steering advisory away from angular direction of the centroid of the polygon relative to the calculated coordinate position of the drilling well in the plane.

8. The apparatus of claim 4, wherein determining the steering advisory further comprises:
determining if the calculated coordinate position of the drilling well in the plane is contained within the polygon; and
either:
in response to determining that the calculated coordinate position of the drilling well in the plane is contained within a perimeter of the polygon, establishing the steering advisory towards the angular direction of the centroid of the polygon relative to the calculated coordinate position of the drilling well in the plane; or
in response to determining that the calculated coordinate position of the drilling well in the plane is not contained within the perimeter of the polygon, establishing the steering advisory away from angular direction of the centroid of the polygon relative to the calculated coordinate position of the drilling well in the plane.

* * * * *